(12) United States Patent
Ishikawa

(10) Patent No.: US 9,052,004 B2
(45) Date of Patent: Jun. 9, 2015

(54) WAVE GEAR DEVICE HAVING THREE-DIMENSIONAL-CONTACT TOOTH PROFILE

(75) Inventor: Shoichi Ishikawa, Yokohama (JP)

(73) Assignee: HARMONIC DRIVE SYSTEMS INC., Shinagawa-Ku, Tokyo (JP)

(*) Notice: Subject to any disclaimer, the term of this patent is extended or adjusted under 35 U.S.C. 154(b) by 177 days.

(21) Appl. No.: 13/993,252

(22) PCT Filed: Aug. 17, 2012

(86) PCT No.: PCT/JP2012/005193
§ 371 (c)(1),
(2), (4) Date: Jun. 11, 2013

(87) PCT Pub. No.: WO2014/027384
PCT Pub. Date: Feb. 20, 2014

(65) Prior Publication Data
US 2014/0047937 A1    Feb. 20, 2014

(51) Int. Cl.
*F16H 49/00* (2006.01)
*F16H 55/08* (2006.01)

(52) U.S. Cl.
CPC ......... *F16H 49/001* (2013.01); *Y10T 74/19642* (2015.01); *F16H 55/0833* (2013.01)

(58) Field of Classification Search
CPC . F16H 49/001; F16H 55/0826; F16H 55/084; F16H 2055/0866
USPC ............................ 74/437, 438, 457, 460, 640
See application file for complete search history.

(56) References Cited

U.S. PATENT DOCUMENTS 1,767,867 A * 6/1930 Wildhaber .................. 74/466
2,906,143 A   9/1959 Musser
(Continued)

FOREIGN PATENT DOCUMENTS

JP  45-41171 A   12/1970
JP  63-115943 A   5/1988
(Continued)

OTHER PUBLICATIONS

International Search Report (PCT/ISA/210) issued on Sep. 25, 2012, by the Japanese Patent Office as the International Searching Authority for International Application No. PCT/JP2012/005193.

*Primary Examiner* — William Kelleher
*Assistant Examiner* — Bobby Rushing, Jr.
(74) *Attorney, Agent, or Firm* — Buchanan Ingersoll & Rooney PC

(57) ABSTRACT

In a wave gear device, similarity-curve tooth profiles BC and AC are adopted as addendum tooth profile shapes for gears, the tooth profiles being derived from a movement trajectory $M_1$ of an external tooth of a flexible externally toothed gear having zero deviation ($\kappa=1$), in relation to an internal tooth at a main cross-section. Profile shifting is performed on the external tooth along the tooth trace for a movement trajectory $M_3$ of the external tooth to share a bottom portion with the movement trajectory $M_1$ at the main cross-section from the main cross-section to an inner edge. Profile shifting is performed on the external tooth along the tooth trace for the movement trajectory of the straight-line tooth-profile portion of the external tooth from the main cross-section to the outer edge to be consistent with the movement trajectory of the straight-line tooth-profile portion of the main cross-section.

10 Claims, 10 Drawing Sheets

(56) References Cited

U.S. PATENT DOCUMENTS

| | | | |
|---|---|---|---|
| 4,850,237 A * | 7/1989 | Hatayama et al. | 74/462 |
| 5,030,184 A * | 7/1991 | Rennerfelt | 475/162 |
| 5,687,620 A * | 11/1997 | Ishikawa | 74/640 |
| 5,782,143 A * | 7/1998 | Ishikawa | 74/640 |
| 6,418,810 B1 * | 7/2002 | Kerr | 74/462 |
| 7,328,632 B2 * | 2/2008 | Ishikawa | 74/640 |
| 7,694,607 B2 * | 4/2010 | Ishikawa et al. | 74/640 |
| 7,735,396 B2 * | 6/2010 | Ishikawa et al. | 74/640 |
| 8,061,229 B2 * | 11/2011 | Zhuravlev | 74/457 |
| 8,661,940 B2 * | 3/2014 | Ishikawa | 74/640 |
| 2007/0180947 A1 | 8/2007 | Ishikawa et al. | |

FOREIGN PATENT DOCUMENTS

| | | |
|---|---|---|
| JP | 64-079448 A | 3/1989 |
| JP | 2007-211907 A | 8/2007 |
| JP | 2011-144916 A | 7/2011 |
| JP | 2011144916 A * | 7/2011 |
| WO | WO 2010/023710 A1 | 3/2010 |
| WO | WO 2010/070712 A1 | 6/2010 |
| WO | WO 2012/104927 A1 | 8/2012 |

* cited by examiner (a)　　　　　(b)　　　　　(c)

(a)

(b)

(c)

WAVE GEAR DEVICE HAVING THREE-DIMENSIONAL-CONTACT TOOTH PROFILE

TECHNICAL FIELD

The present invention relates to a wave gear device having a three-dimensional-contact tooth profile, in which a rigid internally toothed gear and a flexible externally toothed gear mesh in a state of three-dimensional contact. In a state of three-dimensional contact between the rigid internally toothed gear and the flexible externally toothed gear, there is formed an enmeshed state in which both gears are in continuous contact in an axially perpendicular cross-section set in a predetermined position in the tooth-trace direction of both gears. An enmeshed state in which both gears are in partial contact is also formed in axially perpendicular cross-sections in the tooth-trace direction other than the above axially perpendicular cross-section.

BACKGROUND ART

The wave gear device was invented by C. W. Musser (Patent Document 1). Since then, wave gear devices have been the subject of a variety of inventions made by other researchers including the inventor of the present invention. Even with regards specifically to tooth profile, the inventions are diverse. For example, the inventor of the present invention has proposed using an involute tooth profile as the basic tooth profile in Patent document 2; and proposed a method for designing a tooth profile, where a technique is used in which meshing of a rigid internally toothed gear and a flexible externally toothed gear is rack-approximated in order to obtain an addendum tooth profile for the two gears, which contact each other over a wide range, in Patent Documents 3 and 4.

Typically, a wave gear device has an annular rigid internally toothed gear, a flexible externally toothed gear disposed coaxially on the inner side of the rigid internally toothed gear, and a wave generator fitted on the inner side of the flexible externally toothed gear. The flexible externally toothed gear is provided with a flexible cylindrical barrel part, a diaphragm extending in a radial direction from a rear edge of the cylindrical barrel part, and external teeth formed on an external circumferential surface portion of the cylindrical barrel part towards a front-edge opening.

The flexible externally toothed gear is deflected into an ellipsoidal shape by the wave generator, and caused to mesh with the rigid internally toothed gear at both end parts in the direction of the major axis of the ellipsoid. The amount of deflection of the external teeth of the flexible externally toothed gear deflected into an ellipsoidal shape increases from an external-tooth inner edge on the diaphragm side to the external-tooth outer edge on the front-end opening side along the tooth trace direction of the external teeth, the amount of deflection being substantially proportional with respect to the distance from the diaphragm. Each portion of the toothed parts of the flexible externally toothed gear is repeatedly deflected radially outward and inward as the wave generator rotates. This deflecting action of the teeth of the flexible externally toothed gear is known as coning.

When the flexible externally toothed gear is deformed into an ellipsoidal shape by the wave generator, a rim-neutral circle of the external teeth of the flexible externally toothed gear is deformed into an ellipsoidal rim-neutral curve. Taking w to be the amount of radial deflection in relation to the rim-neutral circle before deformation in the longitudinal position of the neutral curve of the rim, the value obtained by dividing the radius of the rim-neutral circle by the reduction ratio of the wave gear device is called the regular (standard) deflection amount wo, and the ratio of these values (w/wo) is called the deviation factor κ. Deflection of the regular deflection amount wo is called "zero-deviation deflection," deflection in an amount larger than the regular deflection amount wo (κ>1) is called "positive-deviation deflection," and deflection in an amount smaller than the regular deflection amount wo (κ<1) is called "negative-deviation deflection." Taking m to be the module of the flexible externally toothed gear and n to be the difference in the number of teeth between the flexible externally toothed gear and the rigid internally toothed gear (n being a positive integer), the amount of deflection w is 2κmn.

In Patent Document 5, the present inventor has proposed a wave gear device provided with a tooth profile capable of continuous meshing, with consideration being given to coning of the teeth of the flexible externally toothed gear. The wave gear device proposed in Patent Document 5 shall be described next.

An arbitrary position in the tooth-trace direction of a cross section perpendicular to the axis of the flexible externally toothed gear is defined as a main cross-section, and the deflection of the flexible externally toothed gear at the main cross-section is set to zero-deviation deflection (κ=1). The meshing of the flexible externally toothed gear and the rigid internally toothed gear is approximated by rack meshing. The movement trajectories of a tooth of the flexible externally toothed gear relative to a tooth of the rigid internally toothed gear as the wave generator rotates is determined for an axially perpendicular cross-section at each position, including the main cross-section, along the flexible externally toothed gear in the tooth trace direction. There is determined a first similarity curve, in which a curve portion extending from a top point to a next bottom point of a zero-deviation-deflection movement trajectory obtained on the main cross-section is scaled down λ-fold (where λ<1) using the bottom point as the center of similarity. The first similarity curve is used as a basic tooth profile of the addendum of the rigid internally toothed gear.

A second similarity curve is determined in which a curve obtained by rotating the first similarity curve by 180 degrees about an endpoint of the first similarity curve is scaled up (1−λ)/λ-fold using the endpoint as the center of similarity. The second similarity curve is used as a basic tooth profile of the addendum of the flexible externally toothed gear.

Profile shifting is applied to tooth-profile portions on either side in the tooth-trace direction of the external teeth of the flexible externally toothed gear so that both a first movement trajectory and a second movement trajectory describe curves that are tangent to the bottom of the zero-deviation deflection movement trajectory on the main cross-section, the first movement trajectory being obtained for each axially perpendicular cross-section in which there occurs negative-deviation deflection (deviation factor κ<1) farther toward the diaphragm than the main cross-section of the external tooth of the flexible externally toothed gear, and the second movement trajectory being obtained in each axially perpendicular cross-section in which there occurs positive-deviation deflection (deviation factor κ>1) farther toward the front-end opening than the main cross-section of the external tooth of the flexible externally toothed gear.

In a wave gear device having a tooth profile formed as described above, it is possible to obtain effective meshing over the range of the tooth trace extending from the main cross-section to the outside end of the outer teeth and the range of the tooth trace extending from the main cross-section to the inside end of the outer teeth, centered around continuous tooth-profile meshing extending over a wide range on the main cross-section. It is thereby possible to transmit a larger torque than with a conventional wave gear device in which meshing occurs over a narrower tooth trace range.

PRIOR ART DOCUMENTS

Patent Documents

[Patent Document 1] U.S. Pat. No. 2,906,143
[Patent Document 2] JP-B 45-41171
[Patent Document 3] JP-A 63-115943
[Patent Document 4] JP-A 64-79448
[Patent Document 5] WO 2010/070712

DISCLOSURE OF THE INVENTION

Problems to be Solved by the Invention

An object of the present invention is to propose a three-dimensional contact tooth profile in a wave gear device in which the tooth profiles of a rigid internally toothed gear and a flexible externally toothed gear form a compound tooth profile provided with a curved tooth-profile portion and a straight-line tooth-profile portion, the three-dimensional contact tooth profile being capable of achieving meshing of the tooth profiles of both gears across the full tooth trace, taking coning of the flexible externally toothed gear into account.

Means to Solve the Problems

In the wave gear device of the present invention, the tooth profiles of the rigid internally toothed gear and the flexible externally toothed gear are defined as a compound tooth profile provided with a straight-line tooth-profile portion and a curved tooth-profile portion. The curve defining the curved tooth-profile portion is a homothetic curve obtained by homothetically converting a portion of the movement trajectory of a tooth of the flexible externally toothed gear in a case where the meshing of both gears is approximated by rack meshing.

The axially perpendicular cross-section near the tooth-trace-direction center of the tooth of the flexible externally toothed gear is set on the main cross-section where zero-deviation deflection occurs. This causes negative-deviation deflection in the portion located farther toward the tooth-trace-direction inside end than the main cross-section on the tooth of the flexible externally toothed gear, and positive-deviation deflection in the portion located farther toward the front-end opening than the main cross-section.

Negative profile shifting is performed in the tooth-depth and tooth-thickness directions on the external-tooth portion where positive-deviation deflection on the external teeth of the flexible externally toothed gear occurs, and the straight-line tooth-profile portions of the external teeth are caused to make contact with the straight-line tooth-profile portions of the internal teeth of the rigid internally toothed gear, so that a state of meshing between the both teeth is formed. In the external-tooth portion where negative-deviation deflection occurs, negative profile shifting is applied only in the tooth-depth direction, and the curved tooth-profile portions of the external teeth are caused to make continuous contact with the curve tooth-profile portions of the internal teeth of the rigid internally toothed gear, so that a continuously enmeshed state of the both teeth is formed. Meshing of both gears across the entire tooth-trace direction is thereby achieved.

Effect of the Invention

In the wave gear device of the present invention, profile-shifting is applied on the external teeth in a different form in order to achieve meshing of tooth profiles on both sides of the main cross-section of the flexible externally toothed gear in the tooth-trace direction, taking coning into account. It is thereby possible to achieve effective meshing between both gears over the entire range of the tooth trace. As a result, according to of the present invention, a wave gear device allowing transmission of more torque is realized.

MODE FOR CARRYING OUT THE INVENTION

A wave gear device according to the present invention is described below with reference to the accompanying drawings.

[Overall Configuration of Wave Gear Device]

Figure 1:
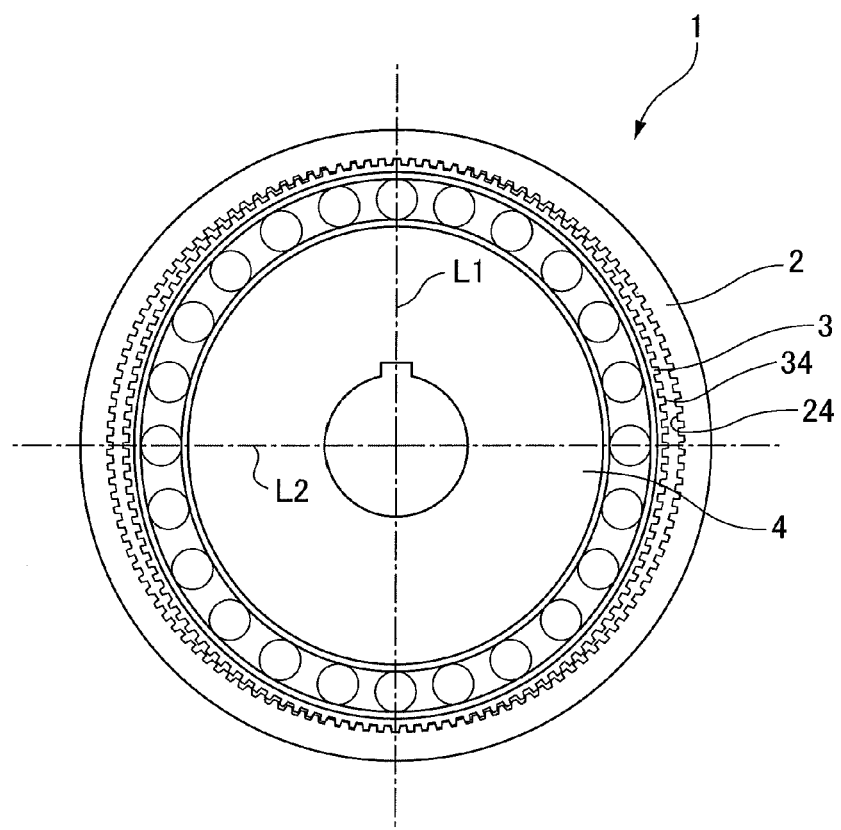
FIG. 1 is a schematic front view of a typical wave gear device.
Figure 2:
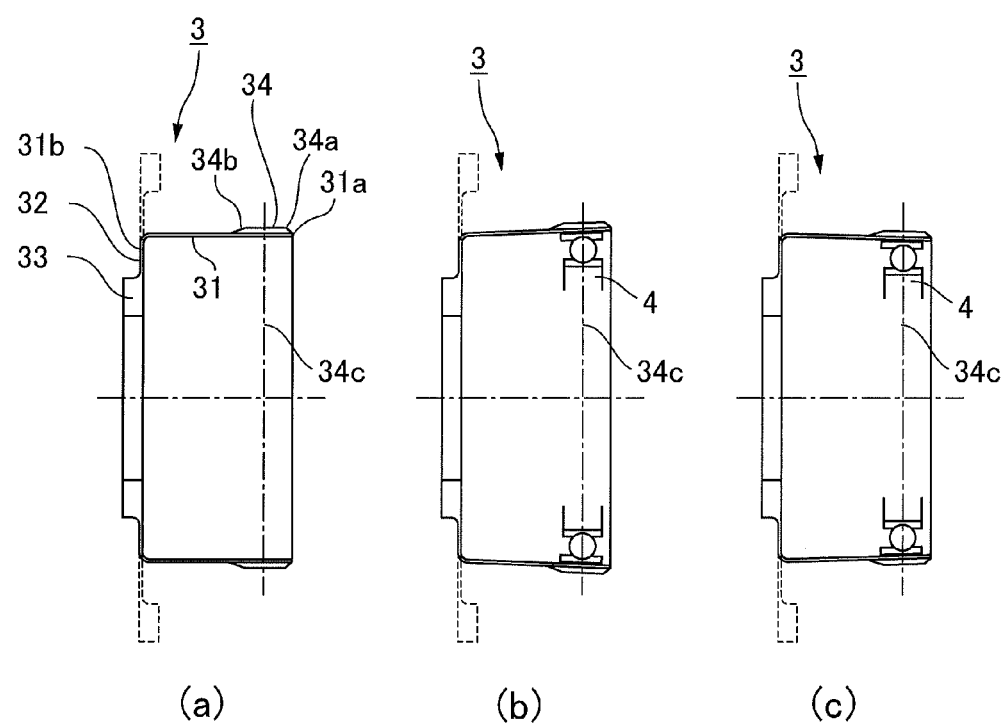
FIG. 2 is a illustrative diagram showing a flexible externally toothed gear in a deflected state, where (a) shows the state before deformation, (b) shows the state of a cross-section including a major axis of an ellipsoidally deformed flexible externally toothed gear, and (c) shows the state of a cross-section including a minor axis of an ellipsoidally deformed flexible externally toothed gear.

FIG. 1 is a front view of a wave gear device. FIG. 2 is a cross-sectional view showing a cross-section including an axis of the opening portion of the flexible externally toothed gear of the wave gear device of FIG. 1 deflected into an ellipsoidal shape, FIG. 2(a) showing the state before deformation, FIG. 2(b) showing a cross-section including a major axis of an ellipsoidal curve after deformation, and FIG. 2(c) showing a cross-section including a minor axis of an ellipsoidal curve after deformation. The solid line in FIGS. 2(a) to (c) shows a cup-shaped flexible externally toothed gear, while the dotted line shows a silk-hat-type flexible externally toothed gear.

As shown in the drawings, the wave gear device 1 has an annular rigid internally toothed gear 2, a flexible externally toothed gear 3 disposed on the inner side of the internal gear, and an ellipsoidally contoured wave generator 4 fitted into the inner side of the external gear. The rigid internally toothed gear 2 and the flexible externally toothed gear 3 are both spur gears of module m. The difference in the number of teeth between the gears is 2n (n being a positive integer), the rigid internally toothed gear 2 having more teeth. The flexible externally toothed gear 3 is deflected into an ellipsoid by the ellipsoidally contoured wave generator 4 and meshes with the rigid internally toothed gear 2 at both end portions in the major axis L1 direction on the ellipsoidal curve. When the wave generator 4 is rotated, the meshing position of the gears 2, 3 moves in the circumferential direction and relative rotation according to the difference in the number of teeth of the gears occurs between the gears 2, 3. The flexible externally toothed gear 3 is provided with a flexible cylindrical barrel part 31, a diaphragm 32 that is formed continuously from a rear edge 31b of the barrel part and widens in the radial direction, a boss 33 formed continuously from the diaphragm 32, and an external teeth 34 formed on the external peripheral surface portion of the cylindrical barrel part 31 toward an opening edge 31a.

Due to the ellipsoidally contoured wave generator 4 fitted in an internal peripheral surface portion of the external tooth-formed portion of the cylindrical barrel part 31, the amount by which the cylindrical barrel part 31 deflects gradually increases toward the radially external side or internal side from the rear edge 31b on the diaphragm side toward the opening edge 31a. As shown in FIG. 2(b), the amount of deflection toward the external side at the cross-section including the major axis L1 of the ellipsoidal curve gradually increases in proportion to the distance from the rear edge 31b toward the opening edge 31a, and as shown in FIG. 2(c), the amount of deflection toward the internal side at the cross-section including the minor axis L2 of the ellipsoidal curve gradually increases in proportion to the distance from the rear edge 31b to the opening edge 31a. Therefore, for the external teeth 34 formed on the external peripheral surface portion toward the opening edge 31a, the amount of deflection varies at each axially perpendicular cross-section in the tooth-trace direction. Specifically, the deflection amount gradually increases from the position at the inner edge 34b toward the diaphragm in the tooth-trace direction of the external tooth 34 to the position at the outer edge 34a on the opening-edge side, in proportion to the distance from the rear edge 31b.

In the present invention, the axially perpendicular cross-section 34c near the tooth-trace-direction center of the external tooth 34 of the flexible externally toothed gear 3 is a cross-section exhibiting zero-deviation deflection, which is referred to as the main cross-section 34c. As a consequence, negative-deviation deflection occurs in the portion of the external tooth of the flexible externally toothed gear 3 located further toward the inner edge in the tooth-trace direction than the main cross-section 34c, and positive-deviation deflection occurs in the portion located further toward the outer edge in the tooth-trace direction than the main cross-section.

[Tooth-Profile Shape of Both Gears]

Figure 5:
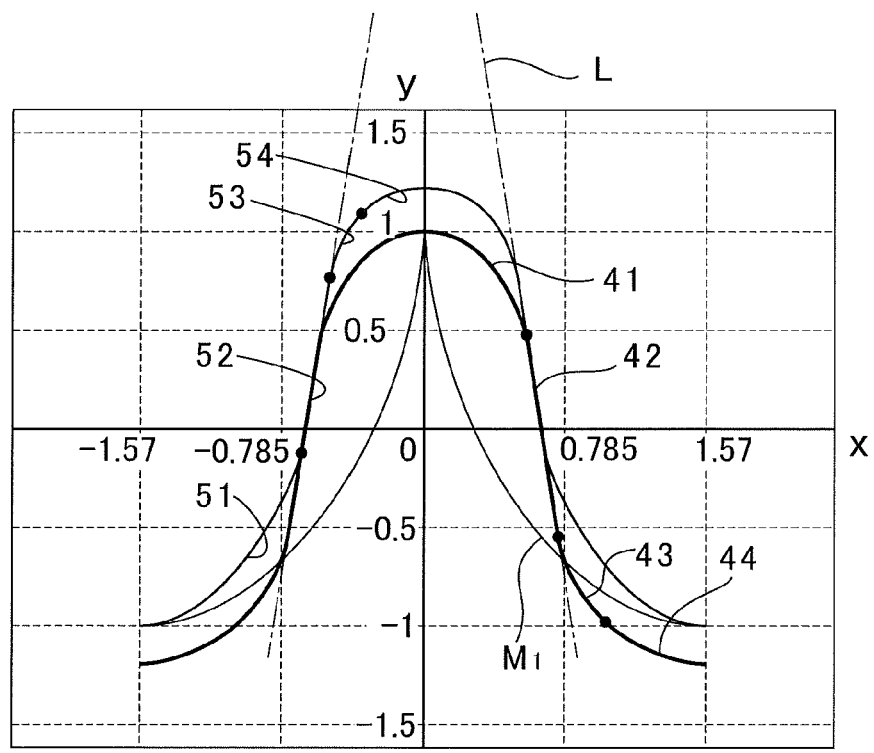
FIG. 5 is an illustrative diagram showing an example of the basic tooth profile shape of an external tooth and the tooth-profile shape of an internal tooth on the axially perpendicular cross-section (main cross-section) of the external tooth.

FIG. 5 is an illustrative diagram showing an example of the basic tooth-profile shape for both gears 2, 3. The tooth-profile shape of the external tooth 34 shown in the drawing is the basic tooth-profile shape for defining the tooth-profile shape for the main cross-section 34c set near the tooth-trace-direction center of the external tooth 34. The basic tooth-profile shape is defined by a convex-curve external-tooth addendum tooth-profile portion 41, an external-tooth straight-line tooth-profile portion 42 continuous with the previous portion, a concave-curve external-tooth flank tooth-profile portion 43 continuous with the previous portion, and an external-tooth root portion 44 continuous with the previous portion. The main cross-section 34c is, for example, an axially perpendicular cross-section through which passes the center line of a ball in a wave bearing, as shown in FIG. 2.

The tooth-profile shape of the external tooth 34 from the main cross-section 34c to the outer edge 34a is, as described below, profile-shifted tooth profile obtained by applying negative profile shifting in the tooth-depth and tooth thickness directions to the basic tooth-profile shape shown in FIG. 5. The tooth-profile shape of the external tooth 34 from the main cross-section 34c to the inner edge 34b is, as described below, a profile-shifted tooth profile obtained by only applying negative profile shifting in the tooth-depth direction to the basic tooth-profile shape shown in FIG. 5.

The internal teeth 24 have the same tooth-profile shape across their entirety in the tooth-trace direction, and are set to the tooth-profile shape shown in FIG. 5. Specifically, the tooth-profile shape of the internal tooth 24 is defined by a convex-curve internal-tooth addendum tooth-profile portion 51, an internal-tooth straight-line tooth-profile portion 52 continuous with the previous portion, an internal-tooth flank tooth-profile portion 53 continuous with the previous portion, and an internal-tooth root portion 54 continuous with the previous portion.

[Method for Forming Tooth Profile for Both Gears]

The method for setting the basic tooth-profile shape of the external tooth 34 and the tooth-profile shape of the internal tooth 24 is described below with reference to FIGS. 3, 4, and 5.

(Movement Trajectory of Teeth According to Rack Approximation)

Figure 3:
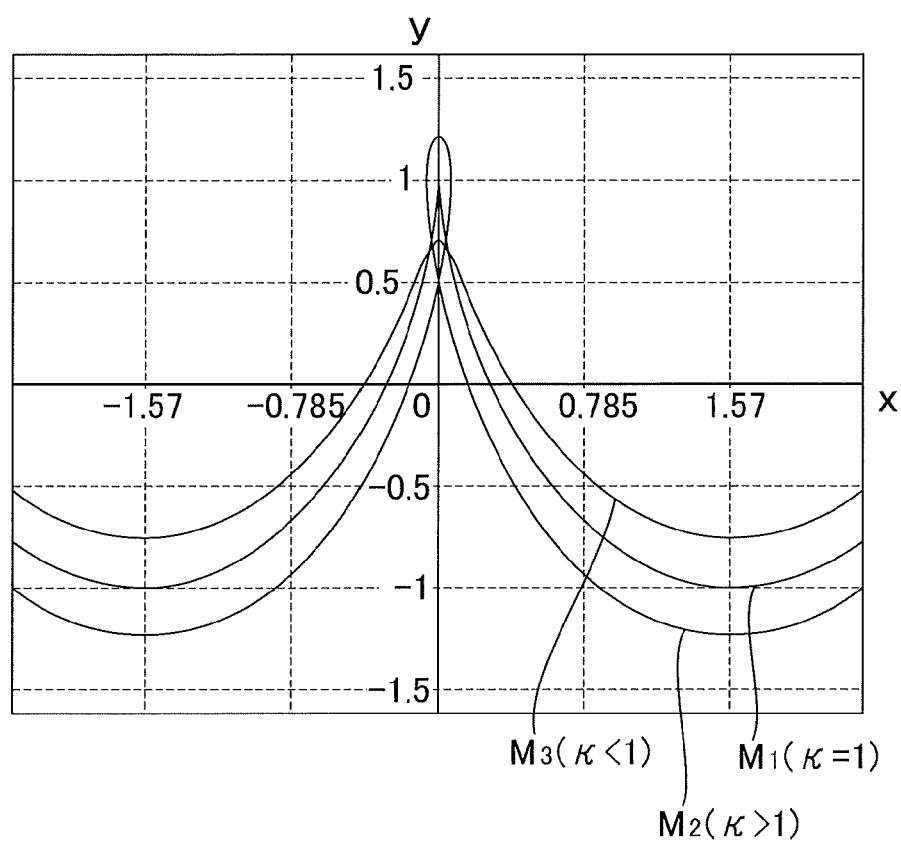
FIG. 3 is an illustrative diagram showing movement trajectories of an external tooth in relation to an internal tooth obtained in instances in which the relative movement of the flexible externally toothed gear and the rigid internally toothed gear were approximated using a rack at axially perpendicular cross-sections of the external tooth of the flexible externally toothed gear at an outer-edge position, a main cross-section position, and an inner-edge position in the tooth trace direction.

FIG. 3 is a diagram showing the movement trajectory of the external tooth 34 of the flexible externally toothed gear 3. When the relative motion of the teeth of both gears 2, 3 of the wave gear device 1 is approximated using a rack, the movement trajectory of the external tooth 34 of the flexible externally toothed gear 3 in relation to the internal tooth 24 of the rigid internally toothed gear 2 is obtained. In FIG. 3, the x-axis shows the tandem-movement direction of the rack, the y-axis shows the direction perpendicular thereto, and e shows the rotation angle of the wave generator. In an axially perpendicular cross-section at an arbitrary position in the tooth-trace direction of the external tooth 34 of the flexible externally toothed gear 3, the amount of deflection at the major axis position L1 on an ellipsoidal rim-neutral line of the external tooth 34, relative to a rim-neutral circle before the external teeth 34 are deflected into an ellipsoidal shape, is 2 κmn, where κ is the deviation factor. The movement trajectory of the external tooth 34 of the flexible externally toothed gear 3 is given by the following equation:

$$x = 0.5mn(\theta - \kappa \sin\theta)$$

$$y = \kappa mn \cos\theta \quad (1)$$

For the sake of convenience, when m=1, n=1 (difference in number of teeth: 2), the movement trajectory is derived from the equation (1a):

$$x = 0.5(\theta - \kappa \sin\theta)$$

$$y = \kappa \cos\theta \quad (1a)$$

The origin of the y-axis in FIG. 3 is the average position of the amplitude of the movement trajectory. Of the movement trajectories, the zero-deviation movement trajectory $M_1$ obtained on the main cross-section 34c is one that is obtained in an instance of zero-deviation deflection where the deviation factor $\kappa=1$. The movement trajectory $M_2$ is one that is obtained in an instance of positive-deviation deflection where the deviation factor $\kappa>1$, and the movement trajectory $M_3$ is one that is obtained in an instance of negative-deviation deflection where the deviation factor $\kappa<1$. In the present invention, the main cross-section 34c, which is the basis for the tooth-profile shape of both gears 2, 3 is, as shown in FIG. 2, set on an axially perpendicular cross-section in a position near the tooth-trace-direction center of the external tooth 34 of the flexible externally toothed gear 3. The positive-deviation movement trajectory $M_2$ is the trajectory obtained on the axially perpendicular cross-section toward the outer edge 34a in relation to the main cross-section 34c in the tooth-trace direction of the external tooth 34, and the negative-deviation movement trajectory $M_3$ is the trajectory obtained on the axially perpendicular cross-section toward the inner edge 34b in relation to the main cross-section 34c in the tooth-trace direction of the external tooth 34.

(Method for Forming Tooth Profile on Main Cross-Section)

Figure 4:
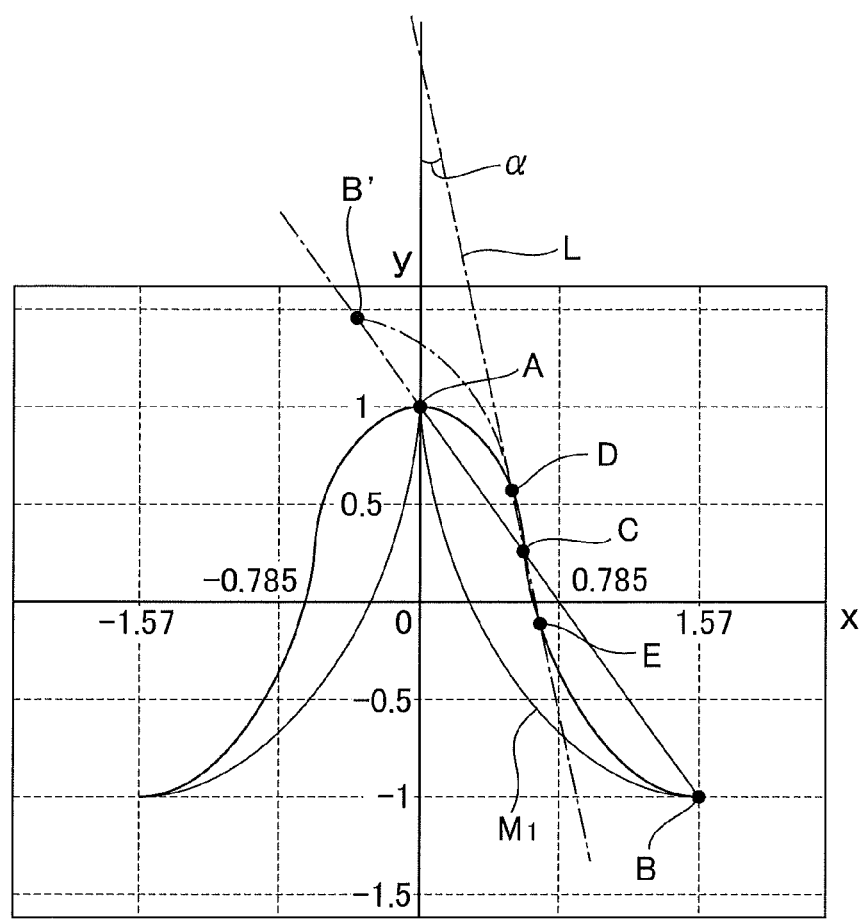
FIG. 4 is an illustrative diagram showing the procedure for deriving an addendum tooth profile for each of the two gears based on the movement trajectory on the main cross-section (zero-deviation cross-section) of an external tooth of the flexible externally toothed gear.

FIG. 4 is an illustrative diagram showing a method for setting the addendum tooth profile for the external tooth 34 and the internal tooth 24. In order to set the addendum tooth profile, the diagram shows the use range set for movement trajectory $M_1$ in a state of zero-deviation deflection. First, in the movement trajectory $M_1$ of the main cross-section 34c, a parameter $\theta$ takes on a curved portion of a range between $\pi$ (point B: bottom part of movement trajectory) and 0 (point A: top part of movement trajectory). This curved portion of movement trajectory $M_1$ is subjected to a $\lambda$-fold ($0<\lambda<1$) similarity transformation using point B as the center of similarity, and a first similarity curve BC is obtained. FIG. 4 shows an instance where $\lambda=0.6$. The first similarity curve BC is adopted as a tooth-profile curve used to define the addendum tooth profile of the rigid internally toothed gear 2.

Using endpoint C of the first similarity curve BC as a center, the first similarity curve BC is rotated 180° to obtain curve B'C. Curve B'C is subjected to a $(1-\lambda)/\lambda$-fold similarity transformation using the endpoint C as the center of similarity, and a second similarity curve AC is obtained. The second similarity curve AC is adopted as a tooth-profile curve used to define the addendum tooth profile of the basic tooth-profile shape of the flexible externally toothed gear 3.

When the tooth-profile curves defining the addendum tooth profiles are expressed as equations, the following equations (2) and (3) are obtained.

Basic equation for the addendum tooth profile of the rigid internally toothed gear:

$$x_{Ca} = 0.5\{(1-\lambda)\pi + \lambda(\theta - \sin\theta)\}$$

$$y_{Ca} = \lambda(1 + \cos\theta)$$

$$(0 \leq \theta \leq \pi) \quad (2)$$

Basic equation for the addendum tooth profile of the flexible externally toothed gear:

$$x_{Fa} = 0.5(1-\lambda)(\pi - \theta + \sin\theta)$$

$$y_{Fa} = (\lambda - 1)(1 + \cos\theta)$$

$$(0 \leq \theta \leq \pi) \quad (3)$$

(Basic Tooth-Profile Shape for Main Cross-Section of External Teeth)

Using the tooth-profile curve AC to define the addendum tooth profile found as described above, a basic tooth-profile shape on the main cross-section 34c of the external tooth 34 is set as described below, with reference being made to FIGS. 4 and 5. In relation to the tooth-profile curve AC for defining the addendum tooth profile on the basic tooth-profile shape of the flexible externally toothed gear 3, a straight line L at a pressure angle $\alpha$ is drawn through point C, and a curve portion AD of the tooth-profile curve AC between an endpoint A and an intersection point D with respect to the straight line L is determined. The curve portion AD is adopted as a tooth-profile curve defining the regular addendum tooth profile, and an external-tooth addendum tooth-profile portion 41 is formed using the tooth-profile curve. An external-tooth straight-line tooth-profile portion 42 is defined by the straight-line portion of the straight line L extending from the intersection point D. In this case, the external-tooth flank tooth-profile portion 43 is defined by a predetermined concave curve, which links the external-tooth straight-line tooth-profile portion 42 and the external-tooth root portion 44 defined by a predetermined external-tooth root curve, so that a predetermined top clearance is obtained for the external-tooth straight-line tooth-profile portion 42 in relation to the internal tooth 24.

(Tooth-Profile Shape for Internal Teeth)

Similarly, the tooth-profile curve BC used for defining the addendum tooth profile is used to form the tooth profile for the internal tooth 24. As represented in FIGS. 4 and 5, the point of intersection between the straight line L and the curve BC is set as E, the curve portion BE is adopted as the tooth-profile curve defining the regular addendum tooth profile, and the internal-tooth addendum tooth-profile portion 51 is formed using the tooth-profile curve. The internal-tooth straight-line tooth-profile portion 52 is defined using the straight-line portion of straight line L extending from intersection point E. Furthermore, the internal-tooth flank tooth-profile portion 53 is defined by a predetermined concave curve, which links the internal-tooth straight-line tooth-profile portion 52 and the internal-tooth root portion 54 defined by a predetermined internal-tooth root curve, so that a predetermined top clearance is obtained for the internal-tooth straight-line tooth-profile portion 52 in relation to an external tooth 34.

The flank tooth-profile portions 43, 44, 53, 54 of both gears do not participate in meshing. Therefore, the flank tooth-profile portions 43, 44, 53, 54 can be set without restriction as long as there is no interference with the respective addendum tooth-profile portions 51, 52, 41, 42.

Thus, the basic tooth-profile shape at the main cross-section 34c of the external tooth 34 shown in FIG. 5, and the tooth-profile shape of the internal tooth 24 are set. In the present example, the pressure angle α of the straight-line tooth profile is 9 degrees. Concerns related to gear machining make a small α value less desirable than having a straight-line tooth profile from a point having a pressure angle from 6 to 12 degrees, and linking to the flank tooth profile.

The meshing of the tooth profile of the internal tooth 24 on the main cross-section 34c and the tooth profile of the external tooth 34, set as described above, is achieved by contact between the addendum tooth-profile portions of both gears 24, 34, and by contact between the straight-line tooth-profile portions. When the external tooth 34 of the flexible externally toothed gear 3 moves along movement trajectory $M_1$ in relation to the internal tooth 24 of the rigid internally toothed gear 2, the addendum tooth profiles are defined according to the similarity curve derived from the movement trajectory; therefore, continuous contact is assured and continuous meshing of both gears is formed.

(Tooth-Profile Shape for External Teeth in Positions Other than on the Main Cross-Section)

During the meshing of the addendum tooth profiles of both gears 2, 3 on the main cross-section 34c, when the flexible externally toothed gear 3 moves along the movement trajectory $M_1$ shown in FIG. 3 in relation to the rigid internally toothed gear 2, the addendum tooth profiles contact continuously due to the properties of the similarity curve.

In contrast, the deviation factor is such that κ>1 at each axially perpendicular cross-section of the external tooth 34 toward the outer edge relative to the main cross-section 34c, and the deviation factor is such that κ<1 at each axially perpendicular cross-section of the external tooth 34 toward the inner edge relative to the main cross-section 34c. As shown in FIG. 3, positive-deviation movement trajectory $N_2$ and negative-deviation movement trajectory $N_3$ both interfere with zero-deviation movement trajectory $M_1$, in which state it is not possible to achieve an enmeshed state in which both gears 24, 34 are in mutual contact.

Accordingly, in the portion of the external tooth 34 from the main cross-section 34c to the outer edge 34a, in order for the straight-line tooth-profile portion of the tooth profile of each axially perpendicular cross-section to be consistent with the external-tooth straight-line tooth-profile portion 42 of the tooth profile on the main cross-section 34c, profile-shifting is performed on the basic tooth-profile shape shown in FIG. 5. The profile-shifted tooth profile thus obtained is used as the tooth profile of each axially perpendicular cross-section from the main cross-section 34c to the outer edge 34a.

The horizontal profile-shifting amount x and vertical profile-shifting amount y required in such a case are given by the following equations (4a, 4b). In the equations, α is the pressure angle of the straight-line portion of the profile-shifted rack tooth profile, the straight-line tooth-profile portion after profile shifting on the axially perpendicular cross-section being determined to be consistent with the external-tooth straight-line tooth-profile portion 42 on the main cross-section 34c.

$$x=0.5(t-\kappa \sin t) \quad (4a)$$

$$y=-\kappa+1-0.5/\tan \alpha \times (t-\kappa \sin t)-\kappa(1-\cos t) \quad (4b)$$

In equations (4a) and (4b), $$t = \sin^{-1} \frac{2\tan\alpha/\kappa - \sqrt{1+(2\tan\alpha)^2 - 1/\kappa^2}}{1+(2\tan\alpha)^2}$$

Next, on each axially perpendicular cross-section of the external tooth 34 from the main cross-section 34c to the inner edge 34b, the deviation factor is such that κ<1, and the deflection amount is small compared to the main cross-section 34c. Therefore, the portion of the external teeth at the bottom of the movement trajectory interferes with a portion of the internal tooth 24, in which state meshing cannot be maintained.

Accordingly, vertical profile shifting is performed on the external tooth 34 from the main cross-section 34c to the inner edge 34b. The profile-shifting amount is determined such that the bottom of movement trajectory $M_3$ of the external tooth 34 of the flexible externally toothed gear 3 in relation to the internal tooth 24 of the rigid internally toothed gear 2 is tangent to point B of the bottom of movement trajectory $M_1$ on the main cross-section 34c (see FIG. 4). In this case, horizontal profile shifting is not performed.

Specifically, on each axially perpendicular cross-section of the external tooth 34 from the position of the main cross-section 34c to the position of the inner edge 34b toward the diaphragm, the profile-shifting amount mny is set according to the deviation factor κ at each axially perpendicular cross-section position such that movement trajectory $M_3$ at each axially perpendicular cross-section is tangent to point B at the bottom of movement trajectory $M_1$ at the main cross-section 34c. When m=1 and n=1, the profile-shifting amount equals y, and the negative value expressed in the following equation (5) is taken.

$$y=\kappa-1 \quad (5)$$

Figure 6:
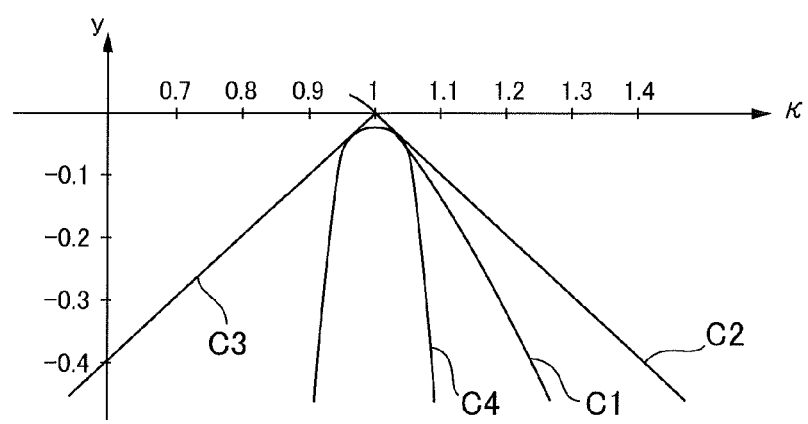
FIG. 6 is a diagram showing the vertical profile-shifting amount for each cross-section of the tooth trace of the flexible externally toothed gear.

FIG. 6 shows an example of the vertical profile-shifting amount at each position of the tooth trace of the external tooth 34 of the flexible externally toothed gear 3 shown in equations (4b) and (5). The horizontal axis in the diagram shows the deviation factor κ of each axially perpendicular cross-section of the flexible externally toothed gear 3, and the vertical axis shows the vertical profile-shifting amount given by equations (4b) and (5) corresponding to the deviation factor κ.

From a practical standpoint, the profile-shift curve C1 expressed by equation (4b) may be approximately substituted with the tangent line C2 drawn at the point on the curve where the deviation factor κ=1. In this case, interference of the tooth thickness occurring during meshing may be used as preloading for eliminating backlash. The profile-shift straight line C3 in FIG. 6 shows the profile-shifting amount at each position on the inner edge 34b from the main cross-section 34c as expressed in equation (5).

Here, when applying profile shifting to an external-tooth portion other than the main cross-section 34c on the basis of profile-shift curve C1 or tangent line C2 and profile-shift straight line C3, the tooth-profile contour of the external tooth 34 as viewed along the tooth-trace direction describes the shape of a broken line having the position of the main cross-section 34c as a peak. In order to make the portion including the peak smooth and continuous, it is preferable to impart the portion including the main cross-section 34c with a smoothly continuous tooth-profile shape using the four-dimensional curve C4 shown in FIG. 6. The four-dimensional curve C4 is tangent to tangent line C2 and profile-shift straight line C3, and has the point where κ=1 as a peak.

A flat portion is accordingly formed near the tooth trace of the main cross-section 34c and the smooth variation of the profile shifting is assured. Also, dimensional management during gear cutting of the flexible externally toothed gear 3 is facilitated.

Figure 7:
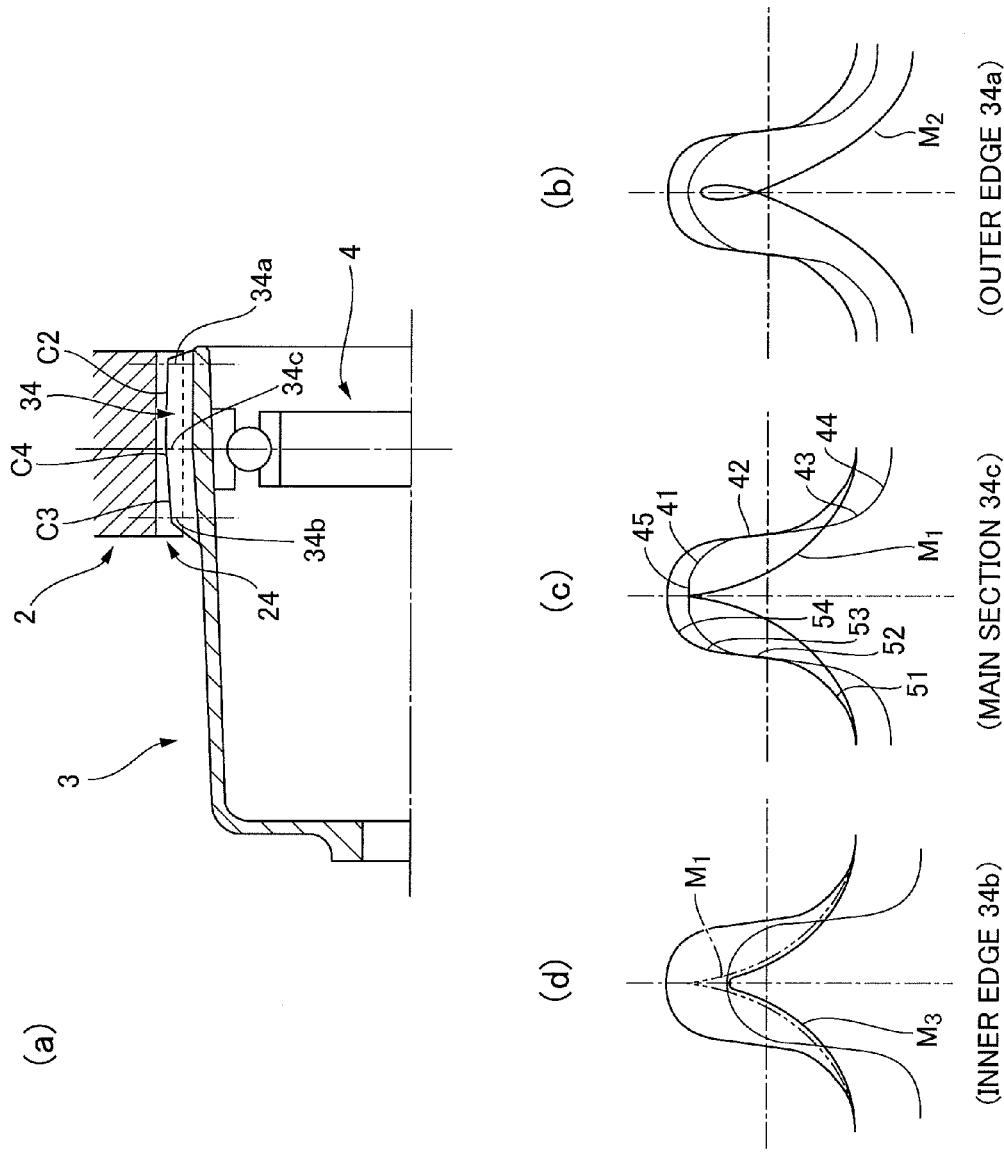
FIG. 7 is an illustrative diagram showing the tooth-profile shape, in the direction of the tooth trace and on each axially perpendicular cross-section, of a profile-shifted external tooth.

FIG. 7(a) is an illustrative diagram showing the tooth-profile contour along the tooth-trace direction of the external tooth 34 and internal tooth 24 set as described above, and showing the state on the major axis L1 (maximum-depth meshing). In the diagram, the portion including the main cross-section 34c of the external tooth 34 is defined by the four-dimensional curve C4, the portion farther toward the outer edge 34a is defined by the tangent line C2 approximating the profile-shift curve C1, and the portion farther toward the inner edge 34b than the main cross-section is defined by profile-shift straight line C3.

FIGS. 7(b), (c), and (d) are illustrative diagrams showing tooth-profile shapes on the axially perpendicular cross-section in each position of, respectively, the outer edge 34a, the main cross-section 34c, and the inner edge 34b of the external tooth 34. These diagrams also show the state at a position on the major axis (L1) (maximum-depth meshing). The tooth-profile shape of the internal tooth 24 is the same as at each axially perpendicular cross-section in the tooth-trace direction. The tooth-profile shape of the external tooth 34 is defined by the basic tooth-profile shape shown in FIG. 5 on the main cross-section 34c, but in order for the top portion of the shape to be made slightly flatter, the shape is defined by a straight line 45. The tooth-profile shape at the axially perpendicular cross-section farther toward the outer edge 34a than the main cross-section 34c has a shape obtained by subjecting the basic tooth-profile shape to vertical and horizontal negative profile shifting. The tooth-profile shape at the axially perpendicular cross-section farther toward the inner edge 34b than the main cross-section 34c has a shape obtained by subjecting the basic tooth-profile shape to vertical negative profile shifting.

Figure 8:
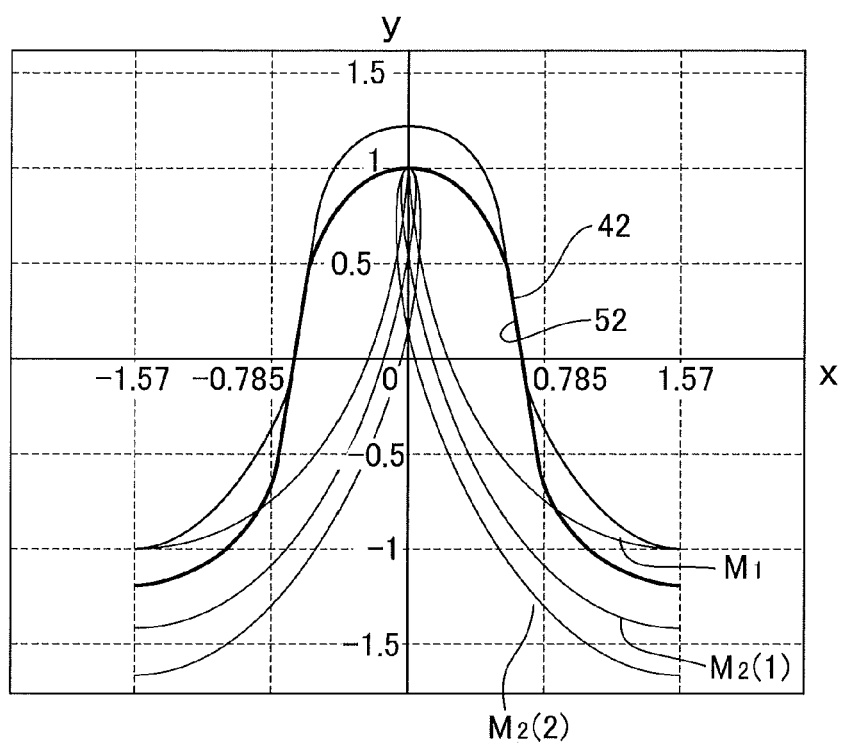
FIG. 8 is a diagram showing movement trajectories due to profile shifting at three locations on the tooth trace of the flexible externally toothed gear, from the main cross-section to the outer edge.

FIG. 8 shows movement trajectories $M_1$, $M_2(1)$, and $M_2(2)$ of the external tooth 34, rack-approximated in relation to the internal tooth 24, in axially perpendicular cross-sections in three locations from the main cross-section 34c to the outer edge 34a of the external tooth 34 of the flexible externally toothed gear 3. In the portion from the main cross-section 34c to the outer edge 34a of the external tooth 34, the meshing of both teeth 34, 24 is formed in a state where the straight-line tooth-profile portion 42 of the external tooth 34 contacts the straight-line tooth-profile portion 52 of the internal tooth 24.

Figure 9:
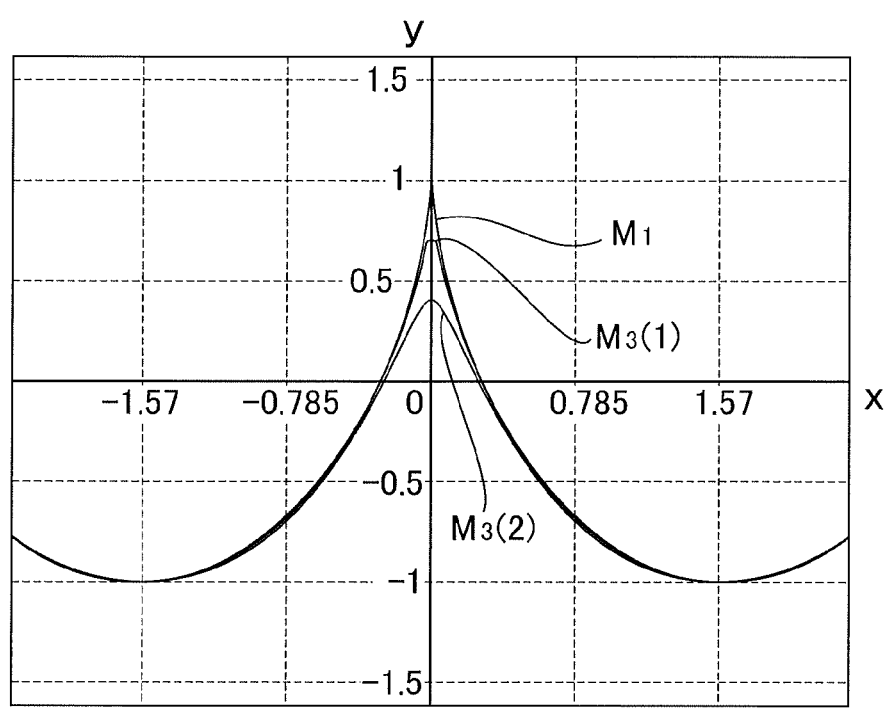
FIG. 9 is a diagram showing movement trajectories due to profile shifting at three locations on the tooth trace of the flexible externally toothed gear, from the main cross-section to the inner edge.

FIG. 9 shows movement trajectories $M_1$, $M_3(1)$, and $M_3(2)$ of the external tooth 34, rack-approximated in relation to the internal tooth 24, in axially perpendicular cross-sections in three locations from the main cross-section 34c to the outer edge 34a of the external tooth 34 of the flexible externally toothed gear 3. As shown in FIG. 9, movement trajectories $M_3(1)$ and $M_3(2)$ at the point on the tooth profile of the external tooth 34 after profile shifting was performed make contact with movement trajectory $M_1$ on the main cross-section 34c at the bottom thereof. The trajectories in the portion in the vicinity of the bottoms of the movement trajectories are well-approximated to movement trajectory $M_1$, a discovery made by the inventor. Meshing from continuous contact between the addendum tooth-profile portions is thereby formed.

Figure 10:
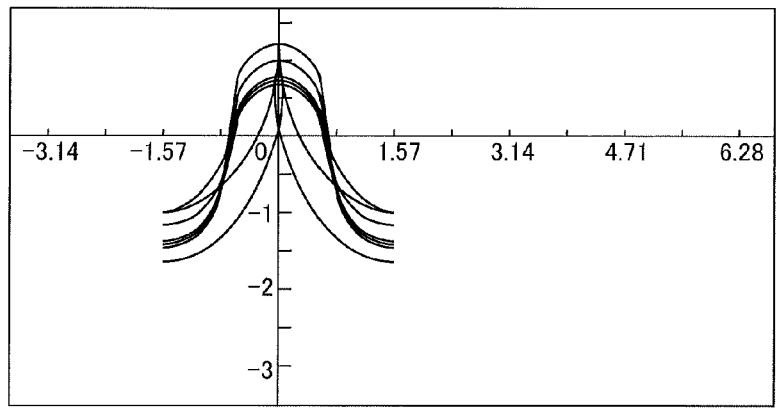
FIG. 10 is a diagram showing movement trajectories of an external tooth on the tooth trace of the flexible externally toothed gear at the outer edge, the main cross-section, and the inner edge, and rack approximation of meshing of both gears.
Figure 10:
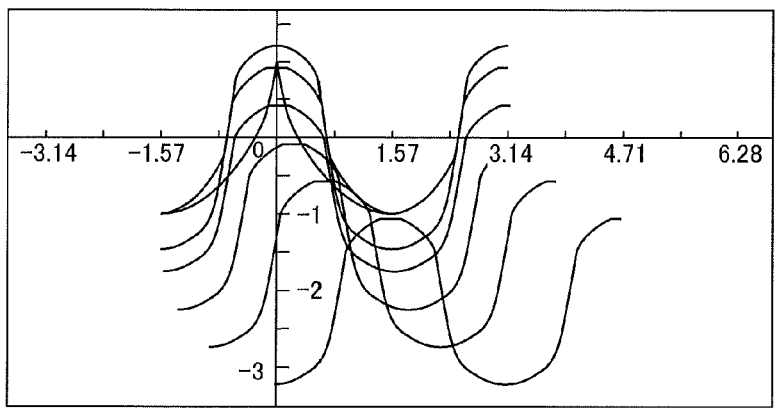
Figure 10:
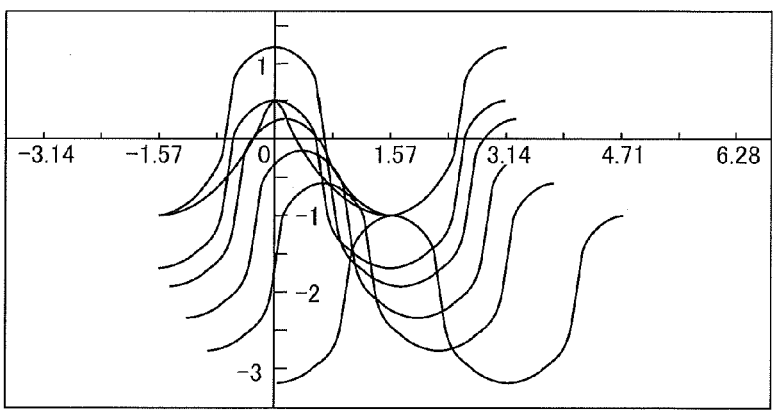

FIGS. 10(a), (b), and (c) are illustrative diagrams showing, by rack approximation, the condition of meshing of the external tooth 34 and the internal tooth 24 having tooth profiles set as described above. FIG. 10(a) is obtained at the position of the outer edge 34a of the external tooth 34, FIG. 10(b) is obtained at the position of the main cross-section 34c, and FIG. 10 (c) is obtained at the position of the inner edge 34b of the external tooth 34. An instance of a movement trajectory provided with a flat portion at the main cross-section 34c is shown. As is clear from the movement trajectories, although approximated, the external tooth 34 of the flexible externally toothed gear 3 has adequate contact with the internal tooth 24 throughout all cross-sections from the outer edge 34a, through the main cross-section 34c, to the inner edge 34b.

The invention claimed is:

1. A wave gear device having a three-dimensional contact tooth profile, comprising:
   a rigid internally toothed gear;
   a flexible externally toothed gear disposed coaxially on an inner side of the internal gear; and
   a wave generator fitted into an inner side of the external gear, wherein
   the flexible externally toothed gear has a flexible cylindrical barrel part, a diaphragm extending in a radial direction from a rear edge of the cylindrical barrel part, and external teeth formed on a portion of an external circumferential surface toward a front-edge opening of the cylindrical barrel part;
   the flexible externally toothed gear is deflected into an ellipsoidal shape by the wave generator and partially meshing with internal teeth of the rigid internally toothed gear;
   the rigid internally toothed gear and the flexible externally toothed gear both are spur gears of module m;
   a number of teeth of the flexible externally toothed gear is 2n fewer than a number of teeth of the rigid internally toothed gear, where n is a positive integer;
   in an axially perpendicular cross-section of the external teeth at an arbitrary position in a tooth-trace direction, an amount of deflection at a major-axis position on an ellipsoidal rim-neutral curve of the flexible externally toothed gear relative to a rim-neutral circle before the external teeth are deflected into an ellipsoidal shape is 2κmn, where κ is a deviation factor;
   the amount of deflection increases in proportion to a distance from the diaphragm along the tooth-trace direction of the external tooth from an external-tooth inner edge toward the diaphragm to an external-tooth outer edge toward the front-edge opening;
   taking as a main cross-section an axially perpendicular cross-section at a position partway between the external-tooth inner edge and the external-tooth outer edge in the tooth-trace direction of the external tooth, a deflection state of the main cross-section is set to a zero-deviation deflection where a deviation factor κ is 1, a deflection state at the external-tooth inner edge is a negative-deviation deflection where the deviation factor is such that κ<1, and a deflection state at the external-tooth outer edge is a positive-deviation deflection where the deviation factor is such that κ>1;
   a movement trajectory of the external tooth in relation to the internal tooth as the wave generator rotates, in an instance where meshing between the external teeth and the internal teeth is approximated using rack meshing, is defined by equation (1) in a case when an x-axis is a tandem-movement direction of the rack, a y-axis is a direction perpendicular to the tandem-movement direction, and an origin of the y-axis is set as an average position of an amplitude of the movement trajectory, with respect to each axially perpendicular cross-section;

$x = 0.5mn(\theta - \kappa \sin\theta)$ $y = \kappa mn \cos\theta$ \hfill (1)

a first similarity curve defined in equation (2) is a similarity curve BC, obtained by subjecting a first curve portion AB extending from a peak point A to a bottom point B to a λ-fold transformation using point B as a center of similarity, where A is the peak point on the movement trajectory obtained on the main cross-section of the external tooth, B is the next bottom point after peak point A, and λ is set as a positive value less than 1;

$$x_{Fa}=0.5(1-\lambda)(\pi-\theta+\sin\theta)$$

$$y_{Fa}=(\lambda-1)(1+\cos\theta)$$

$$(0\leq\theta\leq\pi) \quad (2)$$

a second similarity curve defined in equation (3) is a similarity curve AC, obtained by subjecting a second curve, obtained by rotating the first similarity curve BC 180 degrees about a point C on the first similarity curve BC, to a $\{(1-\lambda)/\lambda\}$-fold transformation using point C as a center of similarity;

$$x_{Ca}=0.5\{(1-\lambda)\pi+\lambda(\theta-\sin\theta)\}$$

$$y_{Ca}=\lambda(1+\cos\theta)$$

$$(0\leq\theta\leq\pi) \quad (3)$$

a basic tooth profile shape defining a tooth profile on the main cross-section of the external tooth is defined by: an addendum tooth-profile portion defined using a curve portion between point A and intersection-point D on the second similarity curve AC; a straight-line tooth-profile portion defined by a portion of a straight line L extending from intersection-point D; and a flank tooth-profile portion connected to the straight-line tooth-profile portion, where α is a positive value less than 20, L is the straight line passing through point C on the second similarity curve AC and having an incline angle of α degrees in relation to the y-axis, and D is the point of intersection between the straight line L and the second similarity curve AC; the curve defining the flank tooth-profile portion being a curve that does not contribute to the meshing of the gears and is set so as to avoid interference with the inner tooth;

a tooth profile on each axially perpendicular cross-section of the external tooth from the main cross-section to the external-tooth outer edge is defined by a profile-shifted tooth profile obtained by performing profile shifting in an x-axis direction and a y-axis direction in relation to the basic tooth-profile on each axially perpendicular cross-section until the straight-line tooth-profile portion on the movement trajectory described by the basic tooth-profile shape on each axially perpendicular cross-section is consistent with the straight-line tooth-profile portion on the movement trajectory described by the basic tooth-profile shape on the main cross-section;

a tooth profile on each axially perpendicular cross-section of the external tooth from the main cross-section to the external-tooth inner edge is defined by a profile-shifted tooth profile obtained by performing profile shifting in the y-axis direction in relation to the basic tooth-profile shape on each axially perpendicular cross-section such that the movement trajectory described by the basic tooth-profile shape on each axially perpendicular cross-section is tangent to a bottom of the movement trajectory described by the basic tooth-profile shape on the main cross-section; and the tooth profile of the inner tooth is defined by an addendum tooth-profile portion defined by a curve portion between the point B on the first similarity curve BC and an intersection point E, a straight-line tooth-profile portion defined by a portion of the straight line extending from the intersection point E, and a flank tooth-profile portion connecting to the straight-line tooth-profile portion, where E is the point of intersection between the straight line L and the first similarity curve BC; the curve defining the flank tooth-profile portion being a curve that does not contribute to the meshing of both gears and is set so as to avoid interference with the outer tooth.

2. The wave gear device having a three-dimensional contact tooth profile according to claim 1, wherein
profile-shifting amounts in the x-axis direction and the y-axis direction performed on the external-tooth portion from the main cross-section of the external tooth to the external-tooth outer edge are defined in equations (4a) and (4b), $$x=0.5(t-\kappa\sin t) \quad (4a)$$

$$y=-\kappa+1-0.5/\tan\alpha\times(t-\kappa\sin t)-\kappa(1-\cos t) \quad (4b)$$

where $$t=\sin^{-1}\frac{2\tan\alpha/\kappa-\sqrt{1+(2\tan\alpha)^2-1/\kappa^2}}{1+(2\tan\alpha)^2}.$$

3. The wave gear device having a three-dimensional contact tooth profile according to claim 2, wherein
the profile-shifting amount in the y-axis direction is a profile-shifting amount defined by a profile-shifting straight line expressed by a tangent line drawn at a point on the profile-shifting curve where the deflection coefficient K is 1, instead of the profile-shifting curve defining the profile-shifting amount in the y-axis direction of equation (4b).

4. The wave gear device having a three-dimensional contact tooth profile according to claim 1, wherein
the profile-shifting amount in the y-axis direction performed on the external-tooth portion of the external tooth from the main cross-section to the external-tooth inner edge is defined by equation (5):

$$y=(\kappa-1)mn \quad (5).$$

5. The wave gear device having a three-dimensional contact tooth profile according to claim 1, wherein
a tooth-trace contour portion of a broken-line tooth-trace contour that has a position of the main cross-section as a peak point and is formed by profile shifting in the y-axis direction performed toward the external-tooth outer-edge side and the external-tooth inner-edge side, using the main cross-section as a boundary, the tooth-trace contour portion including the peak point, is made into a smoothly connecting contour using a four-dimensional curve having a peak point at the position of the main cross-section.

6. The wave gear device having a three-dimensional contact tooth profile according to claim 2, wherein
the profile-shifting amount in the y-axis direction performed on the external-tooth portion of the external tooth from the main cross-section to the external-tooth inner edge is defined by equation (5):

$$y=(\kappa-1)mn \quad (5).$$

7. The wave gear device having a three-dimensional contact tooth profile according to claim 3, wherein
the profile-shifting amount in the y-axis direction performed on the external-tooth portion of the external tooth from the main cross-section to the external-tooth inner edge is defined by equation (5):

$$y=(\kappa-1)mn \quad (5).$$

8. The wave gear device having a three-dimensional contact tooth profile according to claim 2, wherein
a tooth-trace contour portion of a broken-line tooth-trace contour that has a position of the main cross-section as a peak point and is formed by profile shifting in the y-axis direction performed toward the external-tooth outer-edge side and the external-tooth inner-edge side, using the main cross-section as a boundary, the tooth-trace contour portion including the peak point, is made into a smoothly connecting contour using a four-dimensional curve having a peak point at the position of the main cross-section.

9. The wave gear device having a three-dimensional contact tooth profile according to claim 3, wherein
a tooth-trace contour portion of a broken-line tooth-trace contour that has a position of the main cross-section as a peak point and is formed by profile shifting in the y-axis direction performed toward the external-tooth outer-edge side and the external-tooth inner-edge side, using the main cross-section as a boundary, the tooth-trace contour portion including the peak point, is made into a smoothly connecting contour using a four-dimensional curve having a peak point at the position of the main cross-section.

10. The wave gear device having a three-dimensional contact tooth profile according to claim 4, wherein
a tooth-trace contour portion of a broken-line tooth-trace contour that has a position of the main cross-section as a peak point and is formed by profile shifting in the y-axis direction performed toward the external-tooth outer-edge side and the external-tooth inner-edge side, using the main cross-section as a boundary, the tooth-trace contour portion including the peak point, is made into a smoothly connecting contour using a four-dimensional curve having a peak point at the position of the main cross-section.

* * * * *